(12) United States Patent
Matteson et al.

(10) Patent No.: US 10,066,774 B2
(45) Date of Patent: Sep. 4, 2018

(54) DOUBLE WALL TUBE FITTING WITH AN INTEGRATED DIAGNOSTIC PORT

(71) Applicant: United Technologies Corporation, Hartford, CT (US)

(72) Inventors: Peter S. Matteson, South Windsor, CT (US); Joseph Martin Gambill, Ellington, CT (US); Leslie Charles Kurz, Hebron, CT (US); Richard Joseph Bulkovitch, Amston, CT (US); Pawel Socha, Manchester, CT (US); Michael Luther Comeau, Glastonbury, CT (US); Usman Khan, Manchester, CT (US)

(73) Assignee: United Technologies Corporation, Farmington, CT (US)

( * ) Notice: Subject to any disclaimer, the term of this patent is extended or adjusted under 35 U.S.C. 154(b) by 741 days.

(21) Appl. No.: 14/671,101

(22) Filed: Mar. 27, 2015

(65) Prior Publication Data
US 2016/0281896 A1     Sep. 29, 2016

(51) Int. Cl.
*F16L 39/00*     (2006.01)
*F16L 39/02*     (2006.01)
(Continued)

(52) U.S. Cl.
CPC .............. *F16L 37/565* (2013.01); *B64G 1/00* (2013.01); *F16L 9/19* (2013.01); *F16L 17/08* (2013.01);
(Continued)

(58) Field of Classification Search
CPC . F16L 37/565; F16L 9/19; F16L 17/08; F16L 23/167; F16L 25/0018; F16L 39/00;
(Continued)

(56) References Cited

U.S. PATENT DOCUMENTS 3,046,026 A * 7/1962 Burrows .............. F16J 15/0887
                                                    277/510
3,233,927 A     2/1966 Dewhirst
(Continued)

FOREIGN PATENT DOCUMENTS

EP          1229290 A2     8/2002

OTHER PUBLICATIONS

Extended European Search Report for EP Application No. 16162334.3 dated Jul. 29, 2016, 9 pages.

*Primary Examiner* — James M Hewitt, II
*Assistant Examiner* — Stacy N Lawson
(74) *Attorney, Agent, or Firm* — Kinney & Lange, P.A.

(57) ABSTRACT

A fitting for attaching to double wall tubes includes a body, a fitting center port, an outer seal, a tube connection, a pad connection, an inner seal, a groove, and a diagnostic port. The body has a first surface on a first side of the body and a second surface on a second side of the body. The fitting center port extends through the body for passing a primary fluid flow. The tube connection is on the first side of the fitting, and includes an inner connection and an outer connection. The groove is in the second surface surrounding the inner seal and the groove is configured to receive an outer seal. The diagnostic port is in the second surface for transferring a collected fluid through the body to the outer connection.

18 Claims, 5 Drawing Sheets

(51) Int. Cl.
| | |
|---|---|
| *F16L 23/16* | (2006.01) |
| *F16L 9/19* | (2006.01) |
| *G01M 3/28* | (2006.01) |
| *F16L 37/56* | (2006.01) |
| *F16L 17/08* | (2006.01) |
| *F17D 5/02* | (2006.01) |
| *F16L 25/00* | (2006.01) |
| *B64G 1/00* | (2006.01) |

(52) U.S. Cl.
CPC ......... *F16L 23/167* (2013.01); *F16L 25/0018* (2013.01); *F16L 39/005* (2013.01); *F16L 39/02* (2013.01); *F17D 5/02* (2013.01); *G01M 3/283* (2013.01); *F16L 2201/30* (2013.01)

(58) Field of Classification Search
CPC ..... F16L 39/005; F16L 39/02; F16L 2201/30; B64G 1/00; F17D 5/02; F17D 5/04; G01M 3/283
USPC ............... 285/13, 93, 123.12, 123.15, 123.3; 73/40.5 R, 46, 49.1
See application file for complete search history.

(56) References Cited

U.S. PATENT DOCUMENTS

| | | | |
|---|---|---|---|
| 4,445,332 A * | 5/1984 | Thies | F16L 39/02 285/123.17 |
| 4,723,441 A | 2/1988 | Sweeney | |
| 4,890,865 A | 1/1990 | Hosono et al. | |
| 5,199,747 A | 4/1993 | Jahr | |
| 5,494,318 A | 2/1996 | Butts et al. | |
| 6,428,054 B1 | 8/2002 | Zappa et al. | |
| 6,463,739 B1 * | 10/2002 | Mueller | F23R 3/20 60/765 |
| 6,464,261 B1 | 10/2002 | Dybevik et al. | |
| 6,513,838 B2 | 2/2003 | Poehler | |
| 6,701,967 B2 | 3/2004 | Louis et al. | |
| 6,854,487 B2 | 2/2005 | Witemyre et al. | |
| 6,886,388 B1 | 5/2005 | McGill et al. | |
| 8,172,272 B2 | 5/2012 | Petit et al. | |
| 8,820,794 B1 * | 9/2014 | Betz | F16L 33/2076 285/123.15 |
| 2003/0184092 A1 | 10/2003 | Hiller et al. | |
| 2004/0026922 A1 | 2/2004 | Carns et al. | |
| 2005/0120534 A1 * | 6/2005 | Carns | F16L 39/005 29/428 |
| 2007/0151255 A1 * | 7/2007 | Johnson | F23D 14/48 60/776 |
| 2007/0262075 A1 | 11/2007 | Lee et al. | |
| 2009/0127848 A1 * | 5/2009 | Carns | F16L 23/003 285/55 |
| 2011/0025050 A1 | 2/2011 | Holler | |
| 2011/0154886 A1 * | 6/2011 | Carns | F16L 23/003 73/46 |
| 2012/0217739 A1 | 8/2012 | Weinhold | |
| 2013/0160886 A1 * | 6/2013 | Wright, Jr. | F16L 55/16 138/97 |
| 2013/0312865 A1 | 11/2013 | Baur et al. | |
| 2015/0316190 A1 * | 11/2015 | Devani | F16L 23/003 285/119 |

\* cited by examiner

DOUBLE WALL TUBE FITTING WITH AN INTEGRATED DIAGNOSTIC PORT

BACKGROUND

Tubes or pipes are often used to transport various fluids to or from various components within different systems. Tubes or pipes are often constructed from rigid, but smooth materials. Tubes or pipes are designed to be rigid to avoid failure or breaking of a tube, but designed to be internally smooth to allow for fluid to be transported through the tubes with minimal pressure loss. Although tubes and pipes are designed to be strong to avoid failure, they are also often manufactured with a thin wall thickness. This practice saves manufacturing costs and decreases the weight of the tubes. For example, the weight decrease may increase system efficiency when a tube is a component within a movable system, such as an automobile or aircraft.

Tubes may be used to carry high pressure fluids such as oil, gas, air, or water. When the tubes carry flammable substances, such as oil or gas, safety is a concern. More specifically, leaks of flammable fluids caused by pipe or tube failures, or failed connections between tubes or pipes and fittings, are a major safety concern. One solution to this problem is to use double-wall tubes or pipes. A double wall pipe or tube is a secondary tube surrounding a primary tube. In some instances both tubes are designed to carry flow. In other instances, the primary (inner) tube is designed to carry a primary flow and the secondary (outer) tube is designed to prevent leakage. The latter of these instances provides safety and redundancy required in aviation applications.

SUMMARY

In one embodiment, a fitting for attaching to double wall tubes includes a body, a fitting center port, an outer seal, a tube connection, a pad connection, an inner seal, a groove, and a diagnostic port. The body has a first surface on a first side of the body and a second surface on a second side of the body. The fitting center port extends through the body for passing a primary fluid flow. The tube connection is on the first side of the fitting, and includes an inner connection and an outer connection. The inner connection protrudes from the first surface, and the inner connection surrounds the center port and is for attaching an inner tube. The outer connection protrudes from the first surface, and surrounds the inner connection for attaching an outer tube. The pad connection extends from the second surface of the fitting, surrounds the center port, and is for connecting to a mounting pad. The inner seal surrounds the pad connection and is adjacent to the second surface of the fitting. The groove is in the second surface surrounding the inner seal and the groove is configured to receive an outer seal. The diagnostic port is in the second surface for transferring a collected fluid through the body to the outer connection.

In another embodiment, a double wall tube assembly for distributing a pressurized fluid includes a fitting, an inner tube, an outer tube, and a mounting pad. The fitting attaches to double wall tubes and includes a body, a fitting center port, an outer seal, a tube connection, a pad connection, an inner seal, a groove, and a diagnostic port. The body has a first surface on a first side of the body and a second surface on a second side of the body. The fitting center port extends through the body for passing a primary fluid flow. The tube connection is on the first side of the fitting, and includes an inner connection and an outer connection. The inner connection protrudes from the first surface and surrounds the center port. The outer connection protrudes from the first surface and surrounds the inner connection. The pad connection extends from the second surface of the fitting and surrounds the center port. The inner seal surrounds the pad connection and is adjacent to the second surface of the fitting. The groove is in the second surface, surrounding the inner seal and is configured to receive an outer seal. The diagnostic port is in the second surface for transferring a collected fluid through the body to the outer connection. The inner tube is connected to the inner connection and the outer tube is connected to the outer connection and surrounds the inner tube. The mounting pad is for mounting to the second surface of the fitting, and includes a fluid inlet for receiving a primary fluid flow from the fitting.

Another embodiment includes a method for distributing leaked fluid for visual leak detection. The method includes passing a pressurized fluid from an inner tube through a fitting. A leaked fluid is collected at a diagnostic port on a first side of the fitting. The leaked fluid is passed from the diagnostic port to an outer tube connected to a second side of the fitting. The leaked fluid is transmitted to a location for visual detection.

DETAILED DESCRIPTION

Figure 1:
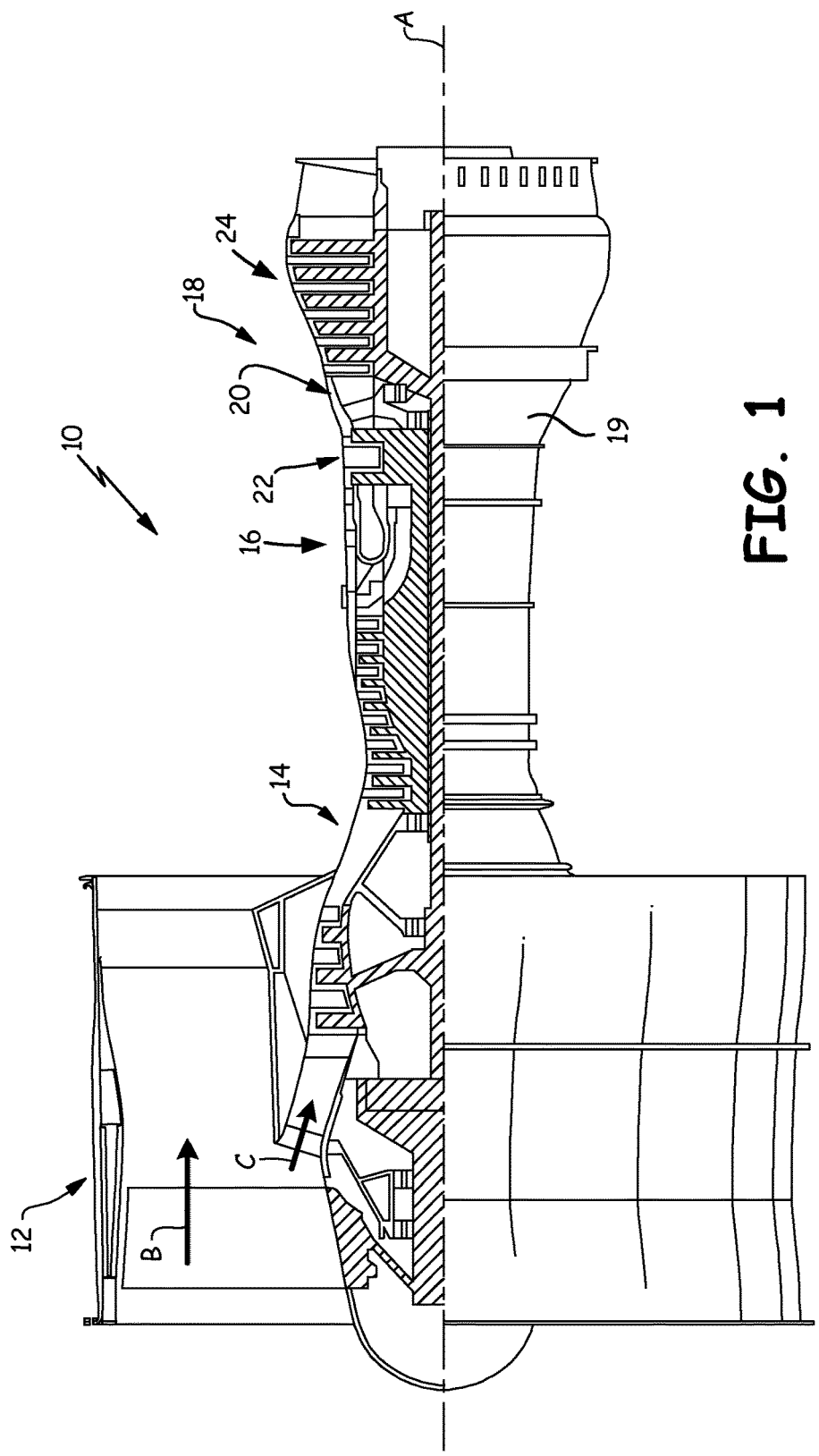
FIG. 1 is a schematic quarter sectional view of an embodiment of a gas turbine engine.

FIG. 1 schematically illustrates example gas turbine engine 10, which includes fan section 12, compressor section 14, combustor section 16, turbine section 18, and cowl 19. Fan section 12 drives air along bypass flow path B while compressor section 14 draws air in along core flow path C where air is compressed and delivered to combustor section 16. In combustor section 16, air is mixed with fuel and ignited to generate a high pressure exhaust gas stream that expands through turbine section 18, where energy is extracted and utilized to drive fan section 12 and compressor section 14.

Mid-turbine frame (MTF) 20 is arranged generally between high pressure turbine 22 and low pressure turbine 24 of turbine section 18. Mid-turbine frame 20 is a static structure that further supports a bearing case in turbine section 18 as well as setting airflow entering low pressure turbine 24. Cowl 19 surrounds and encloses compressor section 14, combustor section 16, and turbine section 18, including MTF 20.

Figure 2:
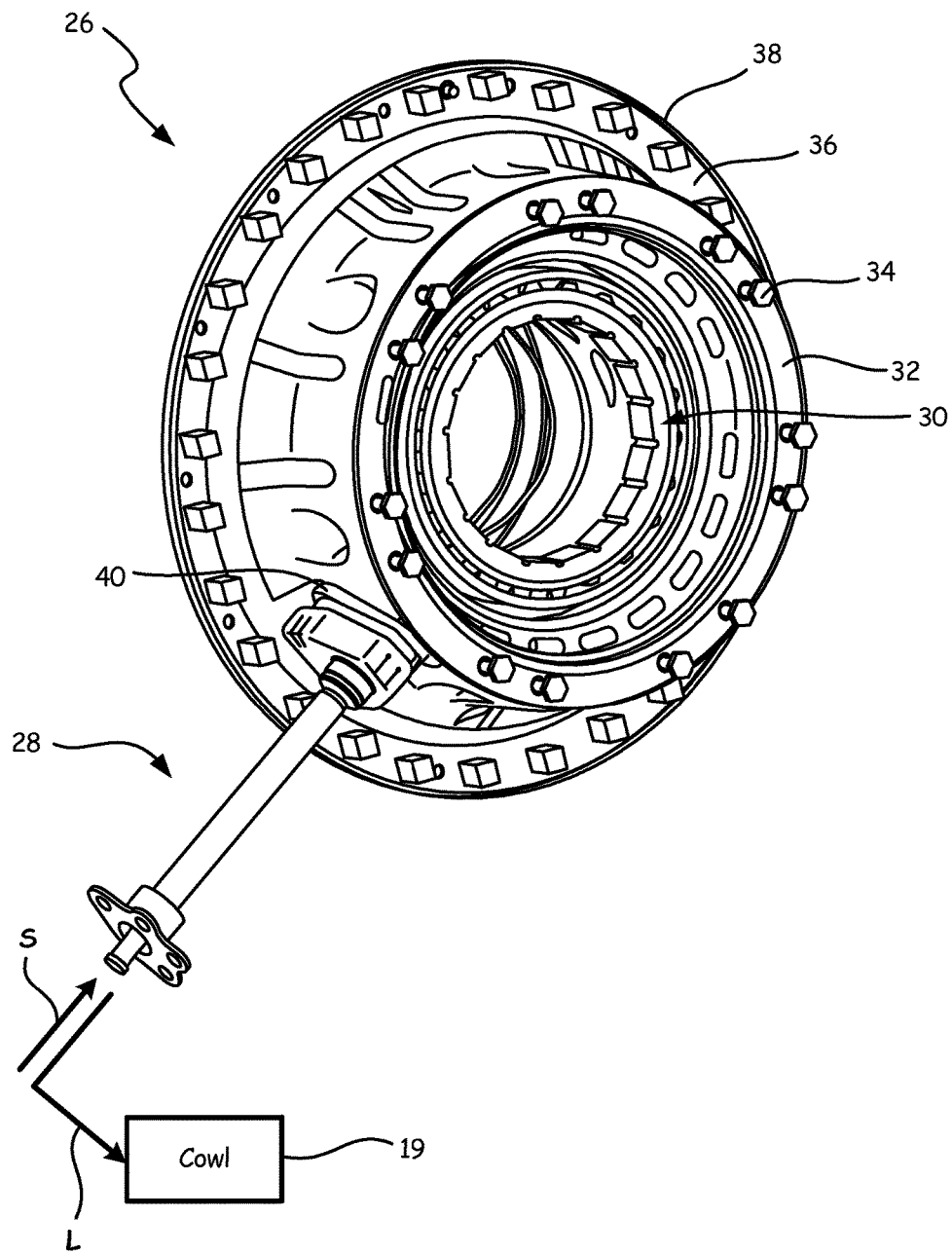
FIG. 2 is an isometric view of a bearing case and tube assembly for an aircraft turbine engine.

FIG. 2 is an isometric view of bearing support 26 and tube assembly 28 and schematic view of cowl 19. Bearing support 26 includes bearing section 30, inner flange mount 32, inner flange bolts 34, outer flange mount 36, outer flange bolts 38, and bearing mount 40. Also shown in FIG. 2 is supply oil S and leaked oil L.

Bearing support 26 mounts to an internal case of MTF 20 (shown in FIG. 1). This connection occurs at inner flange connection 32 and outer flange connection 36. Inner flange bolts 34 connect inner flange 32 to the internal case of MTF 20. Similarly, outer flange bolts 36 connect outer flange 34 to the internal case of MTF 20. These connections secure bearing support 26 and fix the position of bearing support 26 and its static components relative to MTF 20 and turbine engine 10.

Tube assembly 28 is physically connected to bearing mount 40 of bearing support 26 and is secured to bearing mount 40 by bolts (shown in later FIGS.). An inner tube (shown in later FIGS.) of tube assembly 28 is connected to an oil intake connection at bearing mount 40. An outer tube (shown in later FIGS.) of tube assembly 28 is connected to cowl 19.

In one embodiment, supply oil S is supplied through the inner tube of tube assembly 28 to an oil intake connection at bearing mount 40. Oil is then distributed within bearing support 26 to internal bearing components for lubricating and cooling purposes. If supply oil S leaks at the connection between tube assembly 28 and bearing mount 40, leaked oil L will be collected and transmitted by tube assembly 28 to cowl 19. Leaked oil L can be transmitted using gravity as the only motivating force. Leaked oil L can also be motivated by pressure from supply oil S, can be motivated by a motivator, such a pump, or any combination of these. At cowl 19, leaked oil L can be detected during inspection or maintenance through visual inspection. Detection of oil at this location indicates that a seal, tube, or other component in the oil supply system has failed. Detection of leaked oil provides safety benefits, preventing potential component failure, as discussed in later FIGS.

Figure 3A:
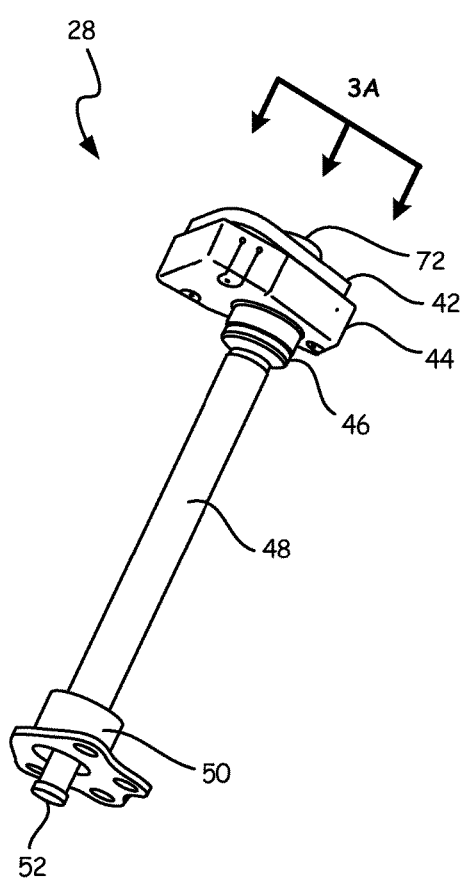
FIG. 3A is an isometric view of the tube assembly of FIG. 1.
Figure 3B:
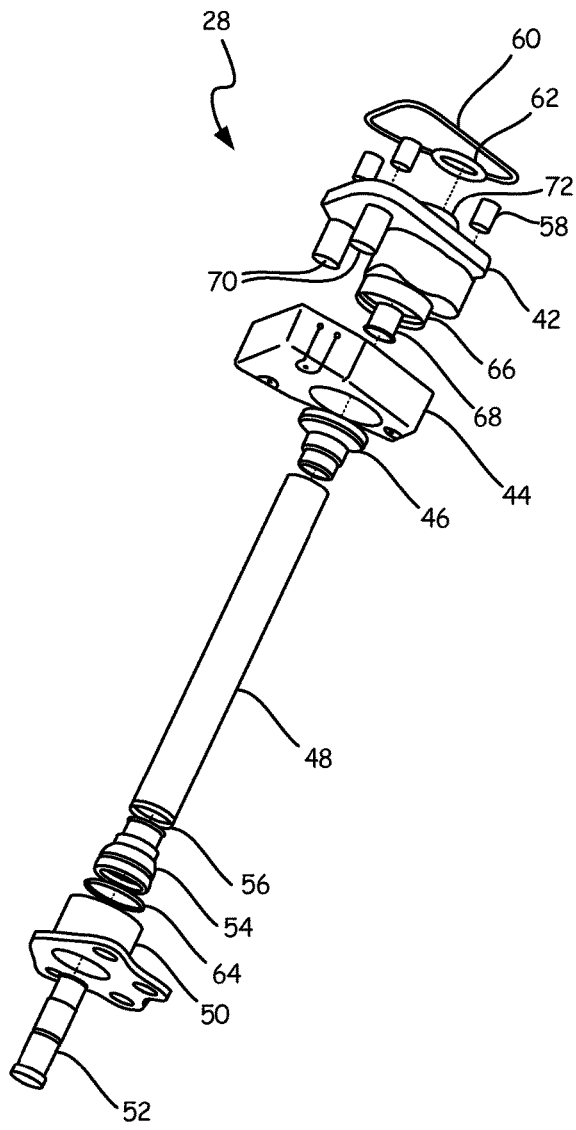
FIG. 3B is an exploded isometric view of the tube assembly of FIG. 3A.

FIG. 3A is an isometric view of tube assembly 28. FIG. 3B is an exploded isometric view of tube assembly 28. FIGS. 3A and 3B are discussed concurrently. Tube assembly 28 includes bearing fitting 42, heat shield 44, bearing coupler 46, heat shield 48, case fitting 50, case inner coupler 52, case outer coupler 54, outer tube 56, inserts 58, bearing fitting outer seal 60, bearing fitting inner seal 62, and case fitting seal 64. Bearing fitting 42 includes outer tube connection 66, inner tube connection 68, mounts 70, and bearing pad connection 72.

Case fitting 50 is mounted to an outer case of MTF 20 with fasteners to secure tube assembly 28 to MTF. Bearing fitting 42 is mounted to bearing mount 40 of bearing support 26, as shown in FIG. 2. Bearing fitting 42 is mounted to bearing mount 40 by bolts (shown in later FIGS.), which secure bearing fitting 42 to bearing mount 40. More specifically, inserts 58 are inserted into mounts 70 and secured in mounts 70 by welding, brazing, press-fitting, or other securing process. Inserts 58 are threaded inserts for receiving a threaded bolt, but may be other female fasteners. Bolts can then pass through bearing mount 40 and into inserts 58 to secure bearing fitting 42 to bearing mount 40. These two connections secure tube assembly 28 between bearing support 26 and an outer case of MTF 20.

Bearing fitting outer seal 60 is applied to a face of bearing fitting 42 in a channel (shown in later FIGS.). Bearing fitting inner seal 62 is also applied to the same face of bearing fitting 42, but surrounds and contacts bearing pad connection 72. Bearing coupler 46 connects to outer tube connection 66, while inner tube connection 68 passes through bearing coupler 46. Bearing coupler 46 can be welded, brazed, or otherwise fastened to bearing fitting 42 at outer tube connection 66. Bearing fitting 42 is composed of metal resistant to relatively high pressures and temperatures, such as titanium alloy, a stainless steel (or other steel) alloy, aluminum alloy, or a nickel alloy.

Inner tube connection 68, which passes through bearing coupler 46, connects to an inner tube (shown in later FIGS.). The inner tube can be brazed, welded, or otherwise fastened to inner tube connection 68. Bearing coupler 46 then connects to outer tube 56, part of which is visible in FIG. 3B under heat shield 48. Outer tube 56, which surrounds the inner tube, is also brazed, welded, or otherwise fastened to bearing coupler 46. Heat shield 48, which surrounds outer tube 56, also connects to bearing coupler 46. Heat shield can be brazed, welded, or otherwise fastened to bearing coupler 46.

At the other end of heat shield 48 near case fitting 50, heat shield 48 makes contact with case outer coupler 54, however heat shield 48 does not connect to case outer coupler 54. Outer tube 56 also connects, in a slip-fit connection type, to case outer coupler 54 and is brazed, welded, or otherwise fastened to case outer coupler 54. Case inner coupler 52 extends through case fitting 50 and through case outer coupler 54 where it connects in a slip-fit manner to the inner tube and is secured by brazing, welding, or other securing methods. Case outer coupler 54 then is seated and connected to case fitting 50 with case fitting seal located at the connection between case fitting 50 and outer case coupler 54. Another set of inner and outer tubes can then be connected to case inner coupler 52 and case outer coupler 54. Alternatively, case outer coupler can be left open to the core compartment.

When all of the components of tube assembly 28 are connected, two flow pathways are created. A primary flow pathway is created from the inside of case internal coupler 52 to the inner tube to inner tube connection 68 of bearing fitting 42. The flow path continues through bearing fitting 42 to bearing pad connection 72, where the primary flow can be supplied to bearing support 26. The primary flow is typically oil for lubrication and cooling of components within bearing support 26.

The second pathway begins at bearing fitting 42. Oil that is leaked and collected by bearing fitting 42 can be delivered to outer tube connection 66 and passed to bearing coupler 46. Bearing coupler 46 can deliver leaked oil to outer tube 56, which can transport the leaked oil to case coupler 54. Case coupler 54 can deliver the leaked oil to another tube connected to case coupler 54 or can deliver the leaked oil to the core compartment.

Figure 4A:
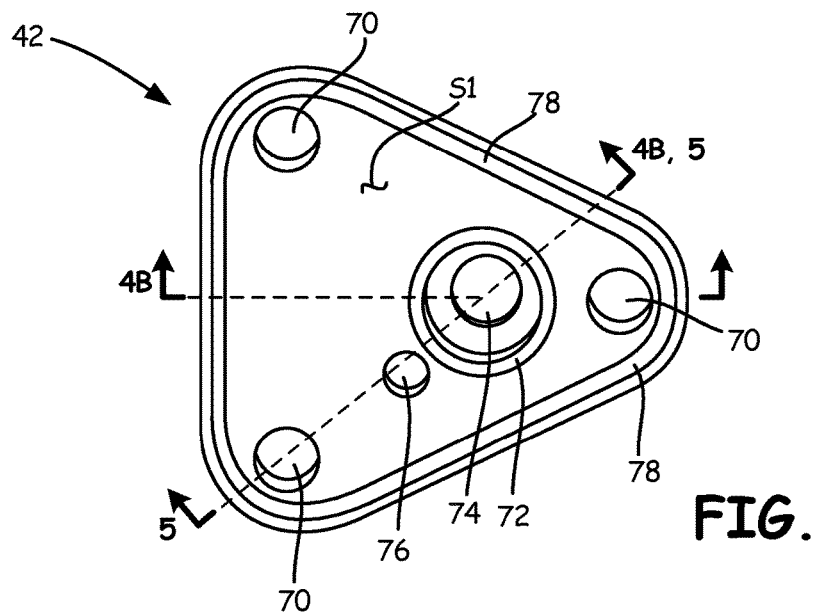
FIG. 4A is a top view of the tube assembly of FIG. 3B.
Figure 4B:
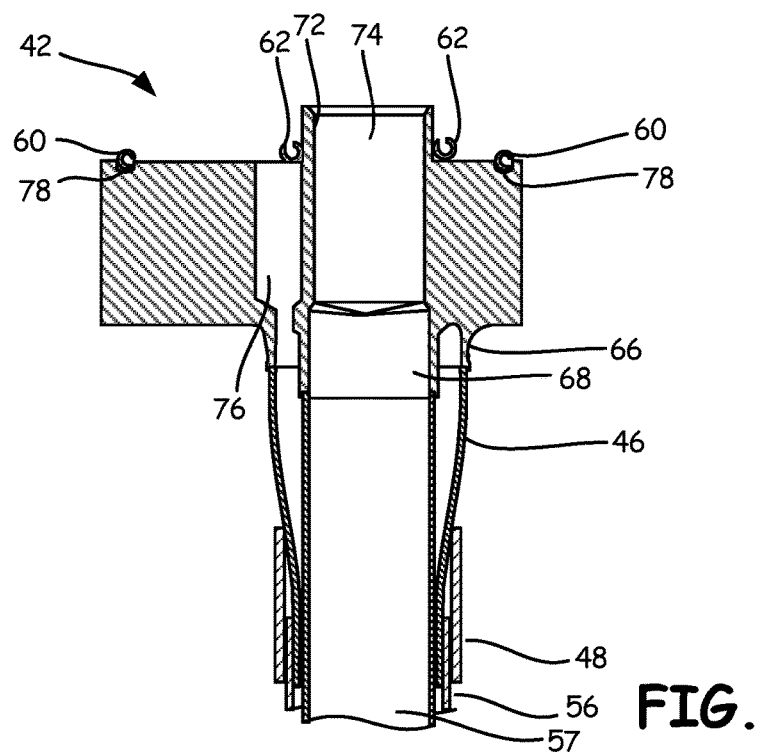
FIG. 4B is a sectional view of section 4B-4B of FIG. 4A.

FIG. 4A is a top view of tube assembly 28 showing only bearing fitting 42 of tube assembly 28. FIG. 4B is a sectional view of section 4B-4B of tube assembly 28. FIGS. 4A and 4B are discussed concurrently. Tube assembly 28 includes bearing fitting 42, bearing coupler 46, heat shield 48, outer tube 56, inner tube 57, bearing fitting outer seal 60, and bearing fitting inner seal 62. Bearing fitting 42 includes outer tube connection 66, inner tube connection 68, mounts 70, bearing pad connection 72, supply port 74, diagnostic port 76, groove 78, and surfaces S1 and S2.

Groove 78 is a groove or channel in surface S1 of bearing fitting 42. Groove 78 is located near the perimeter of surface S1 and surrounds mounts 70. Bearing fitting outer seal 60 is a c type seal, or a metallic seal having a c-shaped profile that seals upon compression, that lies in and is secured in groove 78. Groove 78 can also be located inside mounts 70, so long as groove 78 is radially outboard of diagnostic port 76.

Bearing pad connection 72 is a cylindrical tube-like connection that protrudes perpendicularly from surface S1 of fitting 42. Surrounding bearing pad connection 72 is bearing fitting inner seal 62. Bearing fitting inner seal 62 is a c type seal that circumferentially surrounds bearing pad connection 72 while making contact with surface S1 of bearing fitting 42. In this embodiment, bearing fitting inner seal 62 passes over part of diagnostic port 76.

Diagnostic port 76, which begins at surface S1 of bearing fitting 42, passes through bearing fitting 42 and connects to outer tube connection 66. Similarly, supply port 74 passes through bearing fitting 42 from bearing pad connection 72 into inner tube connection 66, where it meets inner tube 57.

Inner tube connection 68, which passes through bearing coupler 46, connects to inner tube 57. Inner tube 57 can be brazed, welded, or otherwise fastened to inner tube connection 68. Bearing coupler 46 connects to bearing fitting 42 at outer tube connection 66. Bearing coupler 46 then connects to outer tube 56. Outer tube 56 is also brazed, welded, or otherwise fastened to bearing coupler 46. Heat shield 48 also connects to bearing coupler 46, as described above.

In one embodiment, these connections create a primary flow path. The primary flow pathway is from inner tube 57 to inner tube connection 68 of bearing fitting 42. The flow path continues through bearing fitting 42 to bearing pad connection 72, where the primary flow can be supplied to bearing support 26. The primary flow is typically oil for lubrication and cooling of components within bearing support 26.

Oil is an essential lubricant and coolant in aviation applications; however, oil presents a danger as it is a flammable fluid. Turbine engines often operate at temperatures higher than the flash temperature of oil. To combat this safety issue, double-wall tubes are used to contain oil leaks. Inner tubes carry supply oil and outer tubes carry leaked oil. While double-wall tubes provide leak prevention, they present difficulties in manufacturing, assembly, and detection of leaked oil.

This disclosure addresses these problems. Tube assembly 28 creates a second flow path for leaked oil. The second pathway begins at bearing fitting 42. Oil can be leaked around mounts 70 or around bearing pad connection 72 and bearing fitting inner seal 62. This leaked oil will be held within surface S1 of bearing fitting 42 by bearing fitting outer seal 60. Leaked oil L is then collected by diagnostic port 76 and can be delivered through bearing fitting 42 to outer tube connection 66 and passed to bearing coupler 46. Bearing coupler 46 can deliver leaked oil L to outer tube 56, which can transport leaked oil L to case coupler 54 (of FIGS. 3A and 3B). Case coupler 54 can deliver leaked oil L to another tube connected to case coupler 54 or case fitting 50, ultimately delivering leaked oil L to a location where it can be easily detected, such as cowling 19, as described in FIG. 2.

Bearing fitting 42 offers a dual seal against oil leaks at bearing pad connection 72. Bearing fitting inner seal 62 operates as a first seal and bearing fitting outer seal 60 operates as a second seal. The dual sealing of bearing fitting 42 against bearing mount 40 functions as a redundant sealing of bearing fitting 42, which is desirable to prevent leaks where more permanent connections (such as brazing and welding) cannot be used, because of service and manufacturing constraints. Further, having multiple seals allows for diagnostic port 76 to detect leaks before both seals are compromised. When bearing fitting inner seal 62 leaks oil, diagnostic port 76 will transport the leaked oil to a detectable location, as described above. This allows for leaked oil L to be detected before bearing fitting outer seal 60 is compromised.

In this embodiment, diagnostic port 76 is located under bearing fitting inner seal 62. In other words, bearing fitting inner seal 62 passes partially over diagnostic port 76. This allows oil that leaks around bearing fitting inner seal 62 to be more easily communicated to diagnostic port 76. Diagnostic port 76 may also gather oil leaked from other components, for example from bearing mount 40.

Diagnostic port 76 is designed to have a hydraulic diameter (DH) that is greater than the surface tension and capillary forces created by the diagnostic port acting on leaked oil L. Further, the DH of diagnostic port 76 is designed to overcome surface tension and capillary forces by flow of small amounts of leaked oil L, such as 1 mL of leaked oil.

Outer tube 56 and inner tube 57 are tubes or pipes for transporting pressurized fluid. Outer tube 56 and inner tube 57 are comprised of stainless steel, aluminum alloy, nickel alloy, titanium, or any other material suitable for transporting high temperature oils.

Bearing fitting outer seal 60 and bearing fitting inner seal 62 are metallic c type seals. However, other seal types may be used, such as a chevron seal. Bearing fitting outer seal 60 and bearing fitting inner seal 62 are metal c type seals, but can be made from elastomeric or energized Polytetrafluoroethylene (PTFE) materials.

Figure 5:
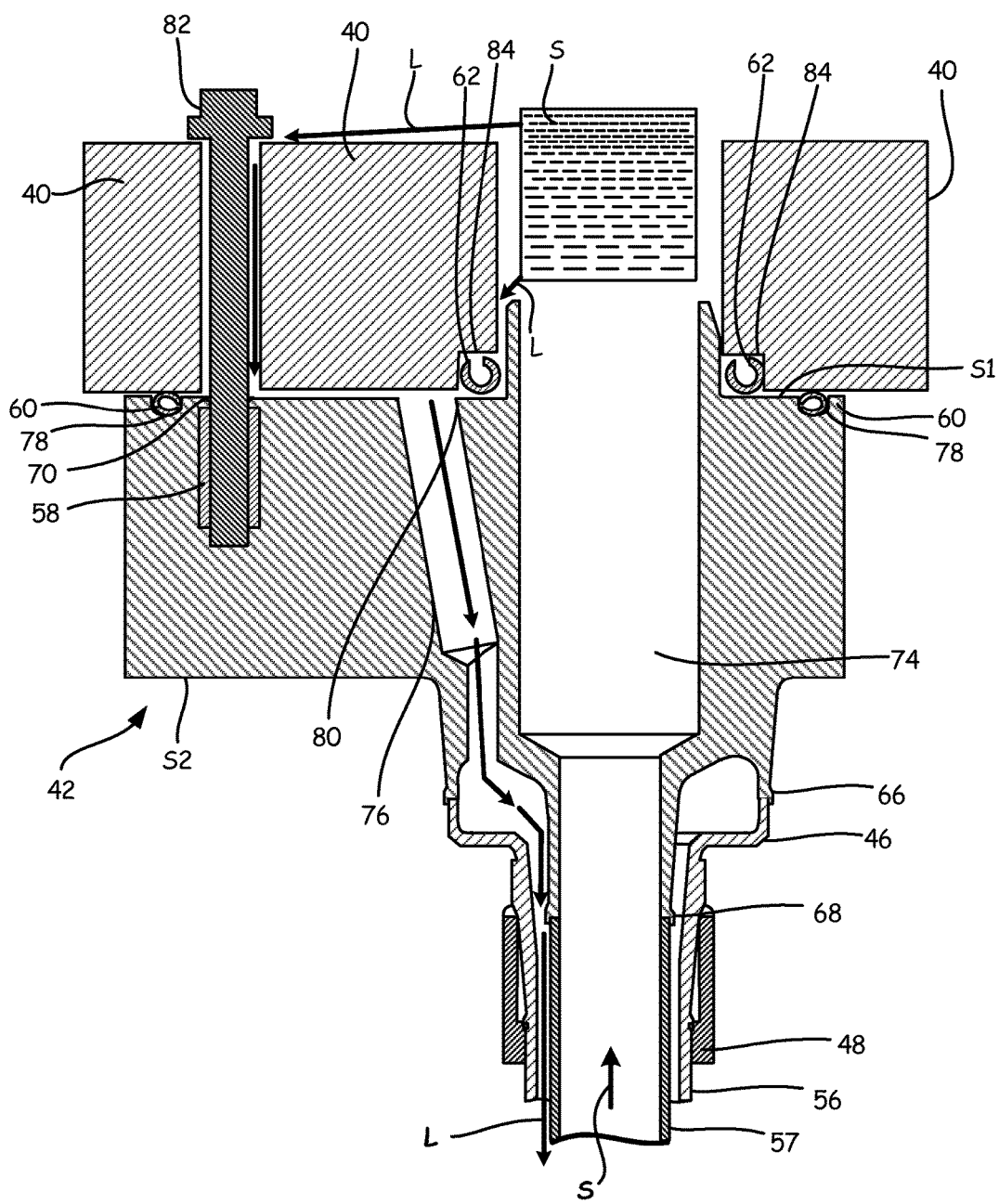
FIG. 5 is a sectional view of section 5-5 of FIG. 4A.

FIG. 5 is a sectional view of section 5-5 of another embodiment of bearing tube assembly 28 of FIG. 4A. Tube assembly 28 includes bearing fitting 42a, bearing coupler 46, heat shield 48, outer tube 56, inner tube 57, bearing fitting outer seal 60, bearing fitting inner seal 62, and bolts 82. Bearing fitting 42 includes outer tube connection 66, inner tube connection 68, mounts 70, bearing pad connection 72, supply port 74, diagnostic port 76a, groove 78, and trench 80. Bearing mount 40 includes notch 84. Also shown in FIG. 5 are surface S1, surface S2, supply oil S and leaked oil L.

The components of bearing fitting 42a are connected consistently with previous FIGS.; however, FIG. 5 further details the connection of bearing fitting 42a to bearing mount 40. Bearing fitting 42a is connected to bearing mount 40 by bolts 82, which pass through bearing mount 40, into mounts 70, and into inserts 58, to which bolts 82 are fastened. The connection between fitting 42a and bearing mount 40 draws fitting 42a to contact the surface of bearing mount 40. Further, bearing fitting outer seal 60, which resides in groove 78, is contacted by bearing mount 40, compressing bearing fitting outer seal 60 between bearing mount 40 and bearing fitting 42. Similarly, bearing fitting inner seal, which resides in groove 78, is contacted and by bearing mount 40, compressing bearing fitting inner seal 62 between bearing mount 40 and bearing fitting 42. In bearing mount 40 notch 84, which may be a groove or channel in bearing mount 40, is located just above bearing fitting inner seal 62. Notch 84 is physically sized to apply sufficient pressure on bearing fitting inner seal 62 to create a seal between bearing fitting 42a and bearing mount 40. Groove 78, and the surface of bearing mount 40 contacting and compressing bearing fitting outer seal 60 also apply sufficient pressure on bearing fitting outer seal 60 to create a seal between bearing fitting 42a and bearing mount 40 at outer seal 60.

In this embodiment, bearing fitting 42a differs from previous embodiments in some ways. One difference is that bearing fitting 42a includes trench 80. Trench 80 is a trench or channel in the surface of bearing fitting 42a between bearing pad connection 72 and diagnostic port 76a. Trench 80 connects to diagnostic port 76a. Diagnostic port 76a is angled through bearing fitting 42a, in this embodiment, before connecting to outer tube connection 66.

Trench 80 allows for oil that is leaked around bearing fitting inner seal 62 to be more easily communicated to diagnostic port 76a when diagnostic port 76a is not located directly underneath a portion of bearing fitting inner seal 62 or notch 84. Trench 80 also allows for easier machining of diagnostic port 76a, because notch 84 allows for the beginning of diagnostic port 76a to be located further away from bearing pad connection 72 and therefore farther from a fillet or chamfer between bearing pad connection 72 and surface S1. This allows for a simpler drilling process, because the drilling surface at surface S1 is more likely to be flat. Also, with diagnostic port 76a being spaced away from bearing pad connection 72 and therefore supply port 74, it is less likely that a cutting tool used to create diagnostic port 76a will penetrate into supply port 74, reducing machining errors and saving time and material.

Though tube assembly 28 has been described to operate in conjunction with an MTF 20, tube assembly 28 and bearing fitting 42 can be applied to any system within an aircraft where double wall tubes may be required. Further, though tube assembly 28 has been described as being a component of an aircraft, tube assembly 28 could be used in any application where double wall tubes are required, such as automotive or process management applications. Additionally, though tube assembly 28 is described as transporting supply and leaked oil, tube assembly 28 can transport any fluid.

Discussion of Possible Embodiments

The following are non-exclusive descriptions of possible embodiments of the present invention.

In one embodiment, a fitting for attaching to double wall tubes includes a body, a fitting center port, an outer seal, a tube connection, a pad connection, an inner seal, a groove, and a diagnostic port. The body has a first surface on a first side of the body and a second surface on a second side of the body. The fitting center port extends through the body for passing a primary fluid flow. The tube connection is on the first side of the fitting, and includes an inner connection and an outer connection. The inner connection protrudes from the first surface, and the inner connection surrounds the center port and is for attaching an inner tube. The outer connection protrudes from the first surface, and surrounds the inner connection for attaching an outer tube. The pad connection extends from the second surface of the fitting, surrounds the center port, and is for connecting to a mounting pad. The inner seal surrounds the pad connection and is adjacent to the second surface of the fitting. The groove is in the second surface surrounding the inner seal and the groove is configured to receive an outer seal. The diagnostic port is in the second surface for transferring a collected fluid through the body to the outer connection.

The fitting of the preceding paragraph can optionally include, additionally and/or alternatively, any one or more of the following features, configurations and/or additional components.

A plurality of fitting mounts can be spaced radially away from the center port on the second side of the body for receiving fasteners, where the outer seal can circumscribe the fitting mounts.

A trench in the second surface of the fitting can be located between the diagnostic port and the pad connection.

The inner seal can pass over part of the diagnostic port.

The fitting can have a shape of a rounded triangular prism.

The fitting body can be formed of a single piece.

The fitting material can be one of a titanium alloy, a stainless steel alloy, aluminum ally, or a nickel alloy.

The diagnostic port can have a hydraulic diameter sized so that surface tension and capillary forces created by the diagnostic port acting on a leaked fluid can be overcome by flow of small amounts of leaked fluid.

The inner seal and outer seal can be c type seals.

In another embodiment, a double wall tube assembly for distributing a pressurized fluid includes a fitting, an inner tube, an outer tube, and a mounting pad. The fitting attaches to double wall tubes and includes a body, a fitting center port, an outer seal, a tube connection, a pad connection, an inner seal, a groove, and a diagnostic port. The body has a first surface on a first side of the body and a second surface on a second side of the body. The fitting center port extends through the body for passing a primary fluid flow. The tube connection is on the first side of the fitting, and includes an inner connection and an outer connection. The inner connection protrudes from the first surface and surrounds the center port. The outer connection protrudes from the first surface and surrounds the inner connection. The pad connection extends from the second surface of the fitting and surrounds the center port. The inner seal surrounds the pad connection and is adjacent to the second surface of the fitting. The groove is in the second surface, surrounding the inner seal and is configured to receive an outer seal. The diagnostic port is in the second surface for transferring a collected fluid through the body to the outer connection. The inner tube is connected to the inner connection and the outer tube is connected to the outer connection and surrounds the inner tube. The mounting pad is for mounting to the second surface of the fitting, and includes a fluid inlet for receiving a primary fluid flow from the fitting.

The assembly of the preceding paragraph can optionally include, additionally and/or alternatively, any one or more of the following features, configurations and/or additional components.

A heat shield can surround the fitting.

A plurality of fitting mounts can be spaced radially away from the center port on the second side of the fitting for receiving a plurality of fasteners and for mounting the fitting to the mounting pad.

The inner seal and the outer seal can be c type seals.

A trench can be in the second surface of the fitting between the diagnostic port and the pad connection.

The inner seal can pass over part of the diagnostic port.

Another embodiment includes a method for distributing leaked fluid for visual leak detection. The method includes passing a pressurized fluid from an inner tube through a fitting. A leaked fluid is collected at a diagnostic port on a first side of the fitting. The leaked fluid is passed from the diagnostic port to an outer tube connected to a second side of the fitting. The leaked fluid is transmitted to a location for visual detection.

The method of the preceding paragraph can optionally include, additionally and/or alternatively, any one or more of the following features, configurations and/or additional components, or steps.

The leaked fluid can be distributed using only gravity as a motivating force to a location for visual detection.

The visual detecting location can be at a cowl of a turbine engine.

The pressurized fluid can be leaked around an inner seal on the first side of the fitting.

The pressurized fluid can be leaked around an outer seal on the first side of the fitting.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A fitting for attaching to double wall tubes, the fitting comprising:
    a body having a first surface on a first side of the body and a second surface on a second side of the body;
    a fitting center port extending through the body for passing a primary fluid flow;
    a tube connection on the first side of the body, the connection comprising:
        an inner connection protruding from the first surface, wherein the inner connection surrounds the center port for attaching an inner tube; and
        an outer connection protruding from the first surface, wherein the outer connection surrounds the inner connection for attaching an outer tube;
    a pad connection extending from the second surface of the body, wherein the pad connection surrounds the center port and connects to a mounting pad;
    an inner seal surrounding the pad connection and adjacent to the second surface of the body;
    a groove in the second surface surrounding the inner seal, wherein the groove is configured to receive an outer seal; and
    a diagnostic port in the second surface for transferring a collected fluid through the body to the outer connection;
    wherein the inner seal passes over part of the diagnostic port.

2. The fitting of claim 1 and further comprising a plurality of fitting mounts spaced radially away from the center port on the second side of the body for receiving fasteners, wherein the outer seal circumscribes the fitting mounts.

3. The fitting of claim 1 and further comprising a trench in the second surface of the body located between the diagnostic port and the pad connection.

4. The fitting of claim 1, wherein the fitting has a shape of a triangular prism with rounded corners.

5. The fitting of claim 1, wherein the fitting body is formed of a single piece.

6. The fitting of claim 1, wherein the fitting material is one of a titanium alloy, a stainless steel alloy, aluminum alloy, or a nickel alloy.

7. The fitting of claim 1, wherein the diagnostic port has a hydraulic diameter sized so that surface tension and capillary forces created by the diagnostic port acting on a leaked fluid are overcome by flow of an amount of leaked fluid.

8. The fitting of claim 1, wherein the inner seal and outer seal are c type seals.

9. A method of distributing leaked fluid for visual leak detection, comprising:
    passing a pressurized fluid from an inner tube through the fitting of claim 1;
    collecting a leaked fluid at the diagnostic port on the second side of the fitting body;
    passing the leaked fluid from the diagnostic port to an outer tube connected to the first side of the fitting body; and
    transmitting the leaked fluid to a location for visual detection.

10. The method of claim 9, wherein the leaked fluid is transmitted using only gravity as a motivating force to the location for visual detection.

11. The method of claim 10, wherein the visual detecting location is at a cowl of a turbine engine.

12. The method of claim 9, wherein the pressurized fluid is leaked around the inner seal on the second side of the fitting body.

13. The method of claim 9, wherein the pressurized fluid is leaked around the outer seal on the second side of the fitting body.

14. A double wall tube assembly for distributing a pressurized fluid, the assembly comprising:
    a fitting for attaching to double wall tubes, the fitting comprising:
        a body having a first surface on a first side of the body and a second surface on a second side of the body;
        a fitting center port extending through the body for passing a primary fluid flow;
        a tube connection on the first side of the body, the connection comprising:
            an inner connection protruding from the first surface and surrounding the center port; and
            an outer connection protruding from the first surface and surrounding the inner connection;
        a pad connection extending from the second surface of the body surrounding the center port;
        an inner seal surrounding the pad connection adjacent to the second surface of the body;
        a groove in the second surface surrounding the inner seal, wherein the groove is configured to receive an outer seal; and
        a diagnostic port in the second surface for transferring a collected fluid through the body to the outer connection;
        wherein the inner seal passes over part of the diagnostic port;
    an inner tube connected to the inner connection;
    an outer tube connected to the outer connection and surrounding the inner tube; and
    a mounting pad for mounting to the second surface of the body, wherein the mounting pad comprises a fluid inlet for receiving a primary fluid flow from the fitting.

15. The double wall tube assembly of claim 14 and further comprising a heat shield surrounding the fitting.

16. The double wall tube assembly of claim 14 and further comprising a plurality of fasteners, and a plurality of fitting mounts spaced radially away from the center port on the second side of the body for receiving the fasteners and for mounting the fitting to the mounting pad.

17. The double wall tube assembly of claim 14, wherein the inner seal and the outer seal are c type seals.

18. The double wall tube assembly of claim 14 and further comprising a trench in the second surface of the body between the diagnostic port and the pad connection.

* * * * *